(12) United States Patent
Kuo et al.

(10) Patent No.: US 9,266,658 B2
(45) Date of Patent: Feb. 23, 2016

(54) CUSHIONING CARTON

(71) Applicant: Shenzhen China Star Optoelectronics Technology Co., Ltd., Shenzhen (CN)

(72) Inventors: Yicheng Kuo, Shenzhen (CN); Yu-Chun Hsiao, Shenzhen (CN); Weifeng Chen, Shenzhen (CN)

(73) Assignee: SHENZHEN CHINA OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 13/703,358

(22) PCT Filed: Sep. 18, 2012

(86) PCT No.: PCT/CN2012/081524
§ 371 (c)(1),
(2) Date: Dec. 11, 2012

(87) PCT Pub. No.: WO2014/032339
PCT Pub. Date: Mar. 6, 2014

(65) Prior Publication Data
US 2015/0191290 A1    Jul. 9, 2015

(30) Foreign Application Priority Data

Aug. 28, 2012 (CN) .......................... 2012 1 0309956

(51) Int. Cl.
*B65D 81/127* (2006.01)
*B65D 81/03* (2006.01)
(Continued)

(52) U.S. Cl.
CPC ............ *B65D 81/1275* (2013.01); *B65D 5/563* (2013.01); *B65D 81/03* (2013.01);
(Continued)

(58) Field of Classification Search
CPC .............. B65D 81/1275; B65D 81/03; B65D 2581/053; B65D 2581/055; B32B 3/28; B32B 29/00; B32B 2439/00; Y10T 428/13; Y10T 428/1303; Y10T 428/24694
See application file for complete search history.

(56) References Cited

U.S. PATENT DOCUMENTS

| 1,929,456 | A | * | 10/1933 | Snyder | .................. B65D 5/324 |
| | | | | | 217/2 |
| 2,376,660 | A | * | 5/1945 | Clark | ..................... B65D 5/445 |
| | | | | | 229/165 |

(Continued)

FOREIGN PATENT DOCUMENTS

| CN | 2712825 Y | 7/2005 |
| CN | 1835882 A | 9/2006 |

(Continued)

OTHER PUBLICATIONS

Abstract of JP 06-8970, Jan. 1994.*

*Primary Examiner* — Donald J Loney
(74) *Attorney, Agent, or Firm* — Mark M. Friedman

(57) ABSTRACT

The present invention provides a cushioning carton, containing a plurality of cardboard materials, the cardboard materials include: a first cardboard layer; a second cardboard layer which is disposed in parallel with the first cardboard layer; at least one bubble bag layer which is disposed and bonded between the first cardboard layer and the second cardboard layer, to form cardboard materials. The cushioning carton of the present invention has a simple structure, easy installation, also can save costs, therefore solving the problem of the prior art cushioning carton having insufficient functionality on cushioning.

6 Claims, 3 Drawing Sheets

(51) Int. Cl.
  *B65D 5/56* (2006.01)
  *B32B 3/28* (2006.01)
  *B32B 29/00* (2006.01)

(52) U.S. Cl.
  CPC . *B32B 3/28* (2013.01); *B32B 29/00* (2013.01); *B32B 2439/00* (2013.01); *B65D 2581/053* (2013.01); *B65D 2581/055* (2013.01); *Y10T 428/13* (2015.01); *Y10T 428/1303* (2015.01); *Y10T 428/24694* (2015.01)

(56) References Cited

U.S. PATENT DOCUMENTS 4,535,828 A * 8/1985 Brockhaus ............ B01D 3/346
  160/236
2004/0265521 A1* 12/2004 Marzano ................ B31B 37/00
  428/35.2
2005/0287321 A1* 12/2005 Horsfield ................ B31B 3/00
  428/34.2
2007/0009333 A1 1/2007 Brown et al.

FOREIGN PATENT DOCUMENTS

| CN | 201343241 Y | 11/2009 |
| CN | 201427412 Y | 3/2010 |
| DE | 4339332 A1 | 5/1995 |
| JP | 06-8970 * | 1/1994 |
| KR | 20020004564 A | 1/2002 |

* cited by examiner

CUSHIONING CARTON

FIELD OF THE INVENTION

The present invention relates to a cushioning carton, and more particularly to a cushioning carton having a cardboard material formed by bubble bag layers.

BACKGROUND OF THE INVENTION

Packaging materials in general, such as corrugated cartons, are used as outer packages, since most of the corrugated cartons are uniformly rectangular in shape, so that there is an advantage that they are easy to be stacked, managed and stored. However, due to the characteristic of the cardboard material, it just can provide a limited cushioning function. When an external force of collision is too large, cartons can easily be damaged. As a result, it is difficult to use the corrugated carton alone to package goods. When packing fragile goods such as high-tech electronic products (especially LCD monitors), it is required to bother with the packaging more. Typically, before an article is put into a carton, it must be wrapped additionally by the cushioning materials such as a multi-layered plastic bag, bubble bags or styrofoam and the like, and usually two or more types of cushioning materials are used in order to enhance the protection of the article. Nevertheless, this also inevitably increases the complexity of the packaging process, as well as increases packaging materials and labor costs.

Therefore, it is necessary to provide an improved cushioning carton so as to solve the problem existing in the prior art.

SUMMARY OF THE INVENTION

In view of the above, the present invention provides a cushioning carton to solve the problem that the conventional corrugated carton technique has insufficient functionality on cushioning.

The purpose of the present invention is to provide a cushioning carton, which includes a plurality of cardboard materials, the cardboard material comprises:

a first cardboard layer;

a second cardboard layer is disposed in parallel with a plurality of the first cardboard layer; and at least one bubble bag layer is disposed and bonded between the first cardboard layer and the second cardboard layer to form the cardboard materials;

Amongst, the first cardboard layer and the second cardboard layer are respectfully formed by at least one corrugated cardboard layer, the first cardboard layer and the second cardboard layer have a plurality of first recessed portions and second recessed portions, respectively.

In one embodiment of the present invention, each bubble bag layer is formed by bonding a first plastic layer with a second plastic layer, and a plurality of air chambers are formed between the first plastic layer and the second plastic layer.

In one of embodiment of the present invention, the first recessed portion is located between two adjacent air chambers.

In one of embodiment of the present invention, the second recessed portion is located between two adjacent air chambers.

Furthermore, the present invention provides another cushioning carton, which includes a plurality of cardboard materials, the cardboard material comprises:

a first cardboard layer;

a second cardboard layer is disposed in parallel with a plurality of the first cardboard layer; and at least one bubble bag layer is disposed and bonded between the first cardboard layer and the second cardboard layer to form the cardboard materials.

In one embodiment of the present invention, each of the first cardboard layer and the second cardboard layer are formed by at least one corrugated cardboard layer.

In one embodiment of the present invention, each bubble bag layer is formed by bonding a first plastic layer and a second plastic layer, and a plurality of air chambers are formed between the first plastic layer and the second plastic layer.

In one embodiment of the present invention, the first cardboard layer includes a plurality of first recessed portions, and the first recessed portion is located between two adjacent air chambers.

In one embodiment of the present invention, the second cardboard layer includes a plurality of second recessed portions, and the second recessed portion is located between two adjacent air chambers.

Furthermore, the present invention provides another cushioning carton which comprises:

a plurality of cardboard materials, each of the cardboard materials has four sides and arranged vertically to each other, wherein the cardboard materials comprise:

a first cardboard layer;

a second cardboard layer is disposed in parallel with a plurality of the first cardboard layer; and at least one bubble bag layer is disposed and bonded between the first cardboard layer and the second cardboard layer to form the cardboard materials; and a plurality of corner fixing structures, each of the corner fixing structures is bonded with two adjacent sides of the cardboard materials to fix the cardboard materials, which are disposed vertically to each other, to form the cushioning carton.

In one embodiment of the present invention, the first board layer and the second board layer are respectively formed by at least one corrugated cardboard layer.

In one embodiment of the present invention, each of the bubble bag layers is formed by bonding the first plastic layer with the second plastic layer, to form a plurality of bubble chambers between the first plastic layer and the second plastic layer.

In one embodiment of the present invention, the first cardboard layer and the second cardboard layer includes a plurality of recessed portions, respectively, the first and the second recessed portions are located between in two adjacent air chambers.

In one embodiment of the present invention, the corner fixing structure is selected from a foam material or a bent corrugated carton.

Compared with the existing technology, the cushioning carton has a simple structure and convenient installation, that can save costs and solve the problem of the prior art cushioning carton having insufficient functionality on cushioning.

DETAILED DESCRIPTION OF THE PREFERRED EMBODIMENTS

Figure 1:
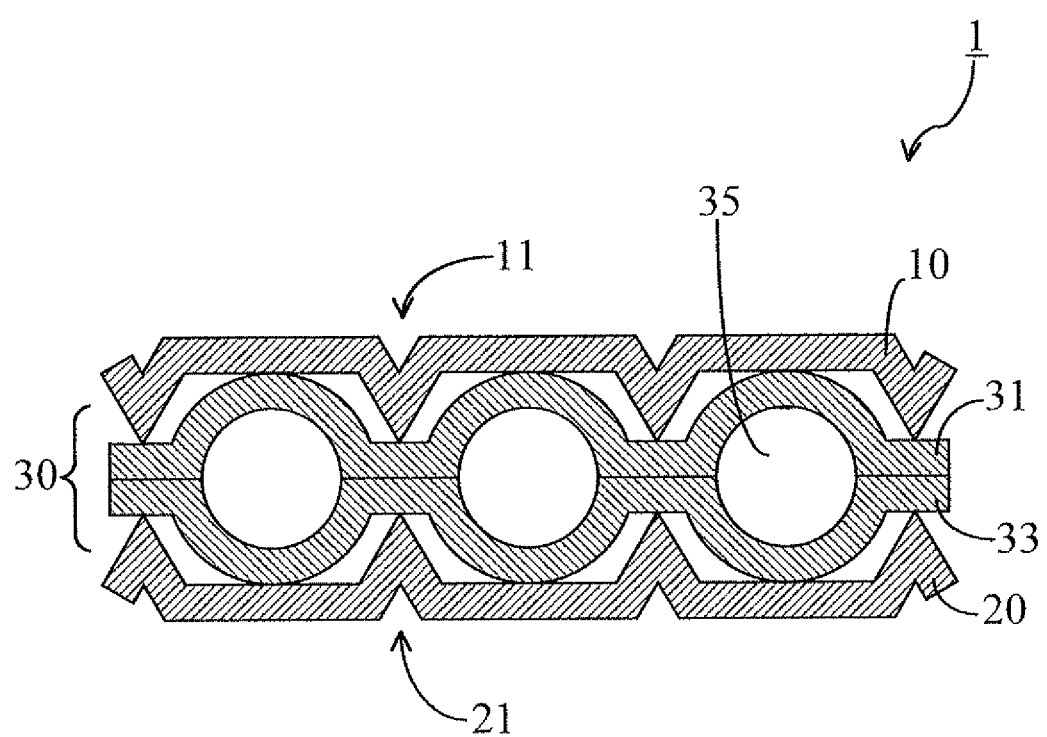
FIG. 1 is sectional view of a cardboard material forming a cushioning carton according to a first preferred embodiment of the present invention.

The structure and the technical means adopted by the present invention to achieve the above and other objects can be best understood by referring to the following detailed description of the preferred embodiments and the accompanying drawings. Furthermore, directional terms described by the present invention, such as upper, lower, front, back, left, right, inner, outer, side, longitudinal/vertical, transverse/horizontal, and etc., are only directions by referring to the accompanying drawings, and thus the used directional terms are used to describe and understand the present invention, but the present invention is not limited thereto.

In the figure, similar structural element is represented by the same reference numerals.

Please refer to FIG. 1, FIG. 1 represents a sectional view of cardboard materials that can be formed cushioning carton in first embodiments of the present invention. The cardboard materials 1 includes a first cardboard layer 10, a second cardboard layer 20 and at least a bubble bag layer 30, the bubble bag layer 30 is disposed and bonded between the first cardboard layer 10 and the second layer 20 to form the cardboard materials 1. In the embodiment, the first cardboard layer 10 and the second cardboard layer are respectfully formed by at least one corrugated cardboard layer. Namely, the first cardboard layer 10 is a complex cardboard (the corrugated cardboard) boned and stacked by a flat cardboard, a wave cardboard and another flat cardboard mutually (not shown), and can select including the single corrugated cardboard layer, double layers or the above-mentioned. Simultaneously, the second cardboard layer 20 includes the same complex cardboard structure, which described above.

In addition, a bubble bag layer 30 is formed and bonded by a first plastic layer 31 and a second plastic layer 33, and a plurality of air chambers 35 are formed between the first plastic layer 31 and the second plastic layer 33. The material of the first plastic layer and the second plastic layer 31, 33 can be used various kinds of plastic, such as polyethylene and the like, not limited thereto. The air chambers 35 are defined the space from the several strips of thermo compression bonding position (not shown), between the first plastic layer and the second plastic layers 31, 33, the cross-sectional can be a circle, an ellipse or a polygon. The air chambers 35 can provide larger buffer features.

Moreover, in the present embodiment, the first cardboard layer 10 can select machined to include a plurality of first recessed portions 11, and the first recessed portions 11 can be located between two adjacent air chambers 35 of the bubble bag layer 30. The second cardboard layer 20 also can select machined as a plurality of second recessed portions 21, the second recessed portions 21 also be located between two adjacent air chambers 35 of the bubble bag layer 30. In the embodiment, the first recessed portions 11 and the second recessed portions 21 are permuted symmetrically (contraposition) on both sides of the bubble bag layer 30. In particular, in some forms of the embodiment, the first cardboard layer and the second cardboard layer of the present invention can be a simple flat-shaped, without having the recessed portions.

From FIG. 1 it can be known, in the embodiment, after expected manufacture the bubble bag layer 30, the first plastic layer 31 of the bubble bag layer 30 can bond with the first cardboard layer 10, and the second plastic layer 33 of the bubble bag layer 30 can bond with the second cardboard layer 20, to form the cardboard materials 1.

According to the cushioning carton in first embodiment of the present invention, is formed by above cardboard materials 1, which bended and bonded on the appropriate site directly, to form the cushioning carton, at this moment each corner of the cushioning carton is basically the bending site of the cardboard materials 1 (not shown).

Figure 2:
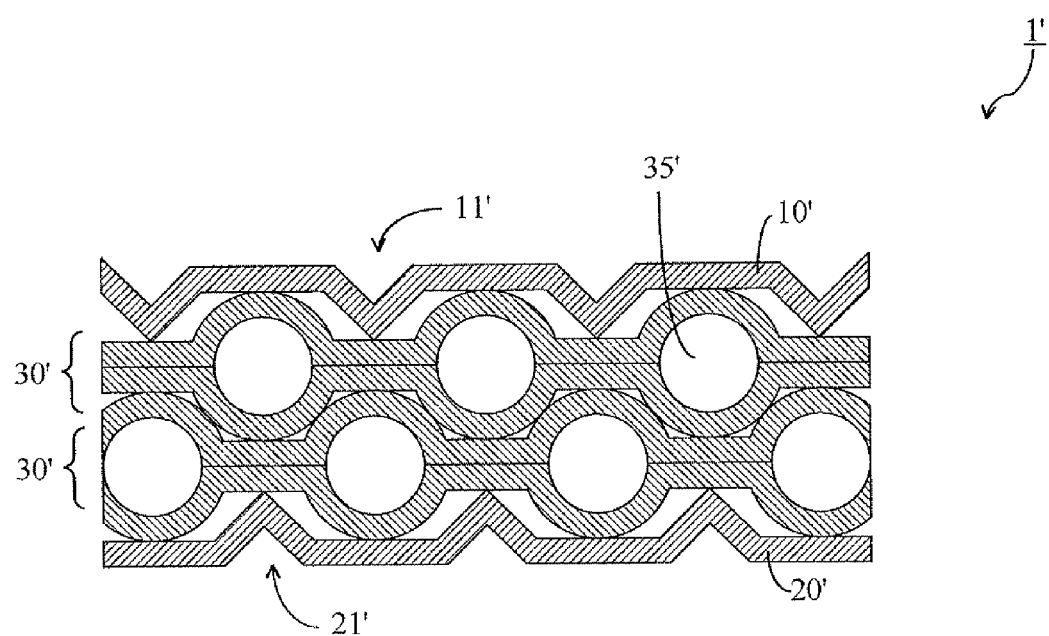
FIG. 2 is a partially sectional view of a cushioning carton according to a second preferred embodiment of the present invention.

Please refer to FIG. 2, FIG. 2 represents a schematic view of the cardboard materials that can be formed cushioning carton in the second embodiments of the present invention. Similar to the cardboard materials 1 of the first embodiment, the cardboard materials 1' comprise the first cardboard layer 10', the second cardboard layer 20' and the two bubble bag layer3 30', the combination method is similar to the cardboard materials 1 of the first embodiment, but the details thereof are omitted herein. In spite of herein is exemplified by the bubble bag layer 30', which includes two layers; the quantity of the bubble bag layer can be more. The cardboard materials 1' also can be bonded to the appropriate position by bending directly in the FIG. 2.

Furthermore, in the embodiment, the first cardboard layer 10' can select machined to be a plurality of the first recessed portions 11', the first recessed portions 11' can be located between two adjacent air chambers 35' of the bubble bag layer 30'. The second cardboard layer 20' also can select machined to be a plurality of the second recessed portions 21', the second recessed portions 21' also be located between in two adjacent air chambers 35' of the bubble bag layer 30'. In the embodiment, each of the first recessed portions 11' and the second recessed portions 21' are permuted symmetrically (dislocation) on both sides of the bubble bag layer 30'.

Figure 3:
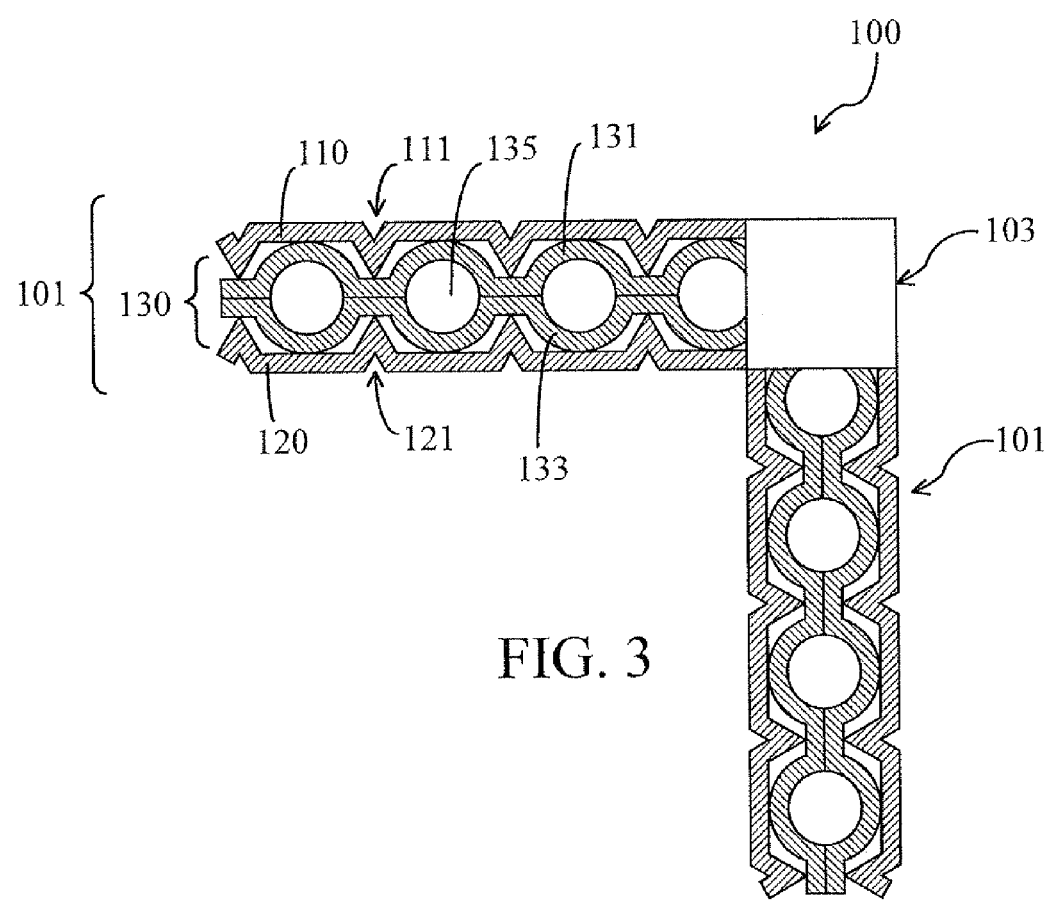
FIG. 3 is a schematic view of a cardboard material using two bubble bag layers according to a third preferred embodiment of the present invention.

Please refer to FIG. 3, FIG. 3 represents a section view of the cardboard materials that can be formed cushioning carton in the third embodiments of the present invention. According to the embodiment, the cushioning carton 100 comprises a plurality of the cardboard materials 101 and the corner fixing structures 103, each of the cardboard materials 101 comprises a first cardboard layer 110, a second cardboard layer 120 and at least one bubble bag layer 130 respectively. Each of the cardboard materials 101 has four sides and arranged vertically to each other. The second cardboard layer 120 and the first cardboard layer 110 are disposed in parallel, and the bubble bag layer 130 is disposed and bonded between the first cardboard layer 110 and the second cardboard layer 120 to form the cardboard materials 101. Each of the corner fixing structures 103 is bonded with two adjacent sides of the cardboard materials 101 to fix the cardboard materials 101, which are disposed vertically to each other to form the cushioning carton 100.

In the embodiment of the present invention, the first cardboard layer 110 and the second cardboard layer 120 is formed by at least one layer of the corrugated cardboard. Each of the bubble bag layers 130 is formed by bonding the first plastic layer 131 with the second plastic layer 133, and to form a plurality of the bubble chambers 135 between the first plastic layer and the second plastic layer. The first cardboard layer 110 includes a plurality of the first recessed portions 111, and the second cardboard layer 120 includes a plurality of the second recessed portions 121, and the first recessed portion 111 and the second recessed portion 121 are located between two adjacent air chambers 135, respectively. The corner fixing structure 130 is selected from a foam material or a bent corrugated carton.

In addition, the embodiment of the cardboard materials 101 can use a double-layer or the above-mentioned bubble bag layers 130, the details of which are omitted herein.

The cushioning carton of the present invention has simple structure, convenient installation and cost savings, and can regard the needs to increase the layer number of the bubble bag to increase the cushioning function of the carton. Therefore, before an article is put into a carton, it can decrease the requirement of extra outer packaging materials. Thus, the present invention has a flexible combination of the cardboard structures, the materials and labor costs can be lowered, and can solve the problem existing in the prior art.

The present invention has been described with above related embodiments thereof and it is understood that many changes and modifications to the described embodiment can be carried out without departing from the scope and the spirit of the invention that is intended to be limited only by the appended claims.

What is claimed is:

1. A cushioning carton, comprising a plurality of cardboard materials, the cardboard materials comprising:
    a first cardboard layer;
    a second cardboard layer, disposed in parallel with the first cardboard layer; and
    at least one bubble bag layer, disposed and bonded in between the first cardboard layer and the second cardboard layer, forming the cardboard materials;
    wherein the first cardboard layer and the second cardboard layer are respectfully formed by at least one corrugated cardboard layer, and the first cardboard layer and the second cardboard layer respectively comprise a plurality of first recessed portions and a plurality of second recessed portions; and
    wherein each bubble bag layer is formed by a first plastic layer bonding with a second plastic layer, a plurality of air chambers are formed between the first plastic layer and the second plastic layer, the first cardboard layer comprises a plurality of first recessed portions, and the first recessed portion is located between two adjacent air chambers, and the second cardboard layer comprises a plurality of second recessed portions, and the second recessed portion is located between two adjacent air chambers.

2. A cushioning carton, comprising a plurality of cardboard materials, the cardboard materials comprising:
    a first cardboard layer;
    a second cardboard layer, disposed in parallel with the first cardboard layer; and
    at least one bubble bag layer, disposed and bonded in between the first cardboard layer and the second cardboard layer, forming the cardboard materials;
    wherein each bubble bag layer is formed by a first plastic layer bonding with a second plastic layer, a plurality of air chambers are formed between the first plastic layer and the second plastic layer, the first cardboard layer comprises a plurality of first recessed portions, and the first recessed portion is located between two adjacent air chambers, and the second cardboard layer comprises a plurality of second recessed portions, and the second recessed portion is located between two adjacent air chambers.

3. The cushioning carton according to claim 2, wherein the first cardboard layer and the second cardboard layer are respectfully formed by at least one corrugated cardboard layer.

4. A cushioning carton, comprising:
    a plurality of cardboard materials, each of the cardboard materials having four sides arranged vertically to each other, and the cardboard materials comprising:
    a first cardboard layer;
    a second cardboard layer, disposed in parallel with the first cardboard layer; and
    at least one bubble bag layer, disposed and bonded between the first cardboard layer and the second cardboard layer, forming the cardboard materials; and
    a plurality of corner fixing structures, each of the corner fixing structures being bonded with two adjacent sides of the cardboard materials for fixing the cardboard materials, which are disposed vertically to each other, to form the cushioning carton;
    wherein each bubble bag layer is formed by a first plastic layer bonding with a second plastic layer, a plurality of air chambers are formed between the first plastic layer and the second plastic layer, the first cardboard layer comprises a plurality of first recessed portions, and the first recessed portion is located between two adjacent air chambers, and the second cardboard layer comprises a plurality of second recessed portions, and the second recessed portion is located between two adjacent air chambers.

5. The cushioning carton according to claim 4, wherein the first cardboard layer and the second cardboard layer are respectfully formed by at least one corrugated cardboard layer.

6. The cushioning carton according to claim 4, wherein the corner fixing structure is selected from a foam material or a bent corrugated carton.

* * * * *

UNITED STATES PATENT AND TRADEMARK OFFICE
CERTIFICATE OF CORRECTION

| | | |
|---|---|---|
| PATENT NO. | : 9,266,658 B2 | Page 1 of 1 |
| APPLICATION NO. | : 13/703358 | |
| DATED | : February 23, 2016 | |
| INVENTOR(S) | : Yicheng Kuo et al. | |

It is certified that error appears in the above-identified patent and that said Letters Patent is hereby corrected as shown below:

On the title page item 73 Assignee should be corrected as follows:

Change
-- Shenzhen China Optoelectronics Technology Co. Ltd., Shenzhen, (CN) --
to
"Shenzhen China Star Optoelectronics Technology Co. Ltd., Shenzhen, (CN)"

Signed and Sealed this
Seventeenth Day of May, 2016

Michelle K. Lee
*Director of the United States Patent and Trademark Office*